United States Patent
Ekambaram et al.

(10) Patent No.: US 10,229,171 B2
(45) Date of Patent: Mar. 12, 2019

(54) AUTOMATIC DISCOVERY OF ANALYSIS SCRIPTS FOR A DATASET

(71) Applicant: International Business Machines Corporation, Armonk, NY (US)

(72) Inventors: Vijay Ekambaram, Chennai (IN); Pratyush Kumar, Chennai (IN); Ashok Pon Kumar Sree Prakash, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 458 days.

(21) Appl. No.: 14/992,851

(22) Filed: Jan. 11, 2016

(65) Prior Publication Data

US 2017/0199917 A1 Jul. 13, 2017

(51) Int. Cl.
*G06F 17/30* (2006.01)
*G06N 99/00* (2019.01)
*G06F 8/70* (2018.01)
*G06F 9/445* (2018.01)

(52) U.S. Cl.
CPC .. *G06F 17/30554* (2013.01); *G06F 17/30477* (2013.01); *G06N 99/005* (2013.01); *G06F 8/70* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 5,802,524 A | 9/1998 | Flowers et al. | |
| 6,564,207 B1 | 5/2003 | Abdoh | |
| 2005/0131677 A1* | 6/2005 | Assadollahi | G10L 15/22 704/201 |
| 2006/0195406 A1* | 8/2006 | Burges | G06F 17/30864 706/12 |
| 2007/0299825 A1 | 12/2007 | Rush et al. | |
| 2010/0114899 A1 | 5/2010 | Guha et al. | |
| 2011/0289484 A1* | 11/2011 | Caine | G06F 8/30 717/127 |

(Continued)

OTHER PUBLICATIONS

Stolee, Kathryn T, et al., "Code Search with Input/Output Queries: Generalizing, Ranking, and Assessment", The Journal of Systems and Software, May 6, 2015, 18 pages.

(Continued)

*Primary Examiner* — Jau Shya Meng
(74) *Attorney, Agent, or Firm* — Ference & Associates LLC

(57) ABSTRACT

A method of automatic discovery of analysis scripts for a dataset, the method including: utilizing at least one processor to execute computer code that performs the steps of: receiving, at a script searching tool, an input dataset; searching, in a script repository, a plurality of datasets having analysis scripts associated therewith; the searching comprising finding, based on a feature of the input dataset, one or more datasets of the plurality of datasets having the feature; identifying, based on the one or more datasets of the plurality of datasets having the feature, one or more associated analysis scripts; and returning, via a user interface, a result listing of the one or more associated analysis scripts. Other aspects are described and claimed.

18 Claims, 2 Drawing Sheets

(56) References Cited

U.S. PATENT DOCUMENTS

2014/0280142 A1 9/2014 Wasson et al.
2015/0095841 A1 4/2015 Fiedler et al.
2016/0078012 A1* 3/2016 Dauw ............... G06F 17/30684
　　　　　　　　　　　　　　　　　　　　　707/706

OTHER PUBLICATIONS

Linstead, Erik, et al., "Sourcerer: mining and searching internet-scale software repositories", Data Mining and Knowledge Discovery, Apr. 2009, 38 pages, Springer Science+Business Media, LLC.

* cited by examiner

AUTOMATIC DISCOVERY OF ANALYSIS SCRIPTS FOR A DATASET

BACKGROUND

Data analysis scripts in programming languages such as "R," "MATLAB" and the like are used for analysis of datasets. For example, an analysis script is program code that runs as a stand-alone program or sub-routine of another program and acts to analyze data of a dataset in a particular way. Analysis scripts are used for analyses such as log analytics, model fitting, forecasting, data clustering, and the like.

It is known that many analysis scripts are reusable, with or without modification, to analyze new or different datasets. Analysis script repositories such as GITHUB are commonly used to store analysis scripts such that they are accessible to others. Commonly, the analysis scripts in such repositories have metadata associated therewith, e.g., a textual description, code comments made by users, and the like.

BRIEF SUMMARY

In summary, one aspect of the invention provides a method of automatic discovery of analysis scripts for a dataset, the method comprising: utilizing at least one processor to execute computer code that performs the steps of: receiving, at a script searching tool, an input dataset; searching, in a script repository, a plurality of datasets having analysis scripts associated therewith; said searching comprising finding, based on a feature of the input dataset, one or more datasets of the plurality of datasets having the feature; identifying, based on the one or more datasets of the plurality of datasets having the feature, one or more associated analysis scripts; and returning, via a user interface, a result listing of the one or more associated analysis scripts.

Another aspect of the invention provides an apparatus for automatic discovery of analysis scripts for a dataset, the apparatus comprising: at least one processor; and a computer readable storage medium having computer readable program code embodied therewith and executable by the at least one processor, the computer readable program code comprising: computer readable program code that receives, at a script searching tool, an input dataset; computer readable program code that searches, in a script repository, a plurality of datasets having analysis scripts associated therewith; said computer readable program code that searches comprising computer readable program code that finds, based on a feature of the input dataset, one or more datasets of the plurality of datasets having the feature; computer readable program code that identifies, based on the one or more datasets of the plurality of datasets having the feature, one or more associated analysis scripts; and computer readable program code that returns, via a user interface, a result listing of the one or more associated analysis scripts.

An additional aspect of the invention provides a computer program product for automatic discovery of analysis scripts for a dataset, the computer program product comprising: a computer readable storage medium having computer readable program code embodied therewith, the computer readable program code comprising: computer readable program code that receives, at a script searching tool, an input dataset; computer readable program code that searches, in a script repository, a plurality of datasets having analysis scripts associated therewith; said computer readable program code that searches comprising computer readable program code that finds, based on a feature of the input dataset, one or more datasets of the plurality of datasets having the feature; computer readable program code that identifies, based on the one or more datasets of the plurality of datasets having the feature, one or more associated analysis scripts; and computer readable program code that returns, via a user interface, a result listing of the one or more associated analysis scripts.

A further aspect of the invention provides a method of automatic discovery of analysis scripts for a dataset, the method comprising: utilizing at least one processor to execute computer code that performs the steps of: receiving, at a script searching tool, an input dataset; extracting at least one feature from the input dataset, said extracting comprising use of one or more features identified from a user specific dataset repository; searching, in a script repository, a plurality of datasets having analysis scripts associated therewith; said searching comprising finding, based on the extracted feature of the input dataset, one or more datasets of the plurality of datasets having the extracted feature; identifying, based on the one or more datasets of the plurality of datasets having the extracted feature, one or more associated analysis scripts; prioritizing, using user specific information, the one or more associated analysis scripts; and returning, via a user interface, a result listing comprising the one or more associated analysis scripts; said results list being organized according to the prioritizing; wherein said results list is customized by consultation of the user specific information.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
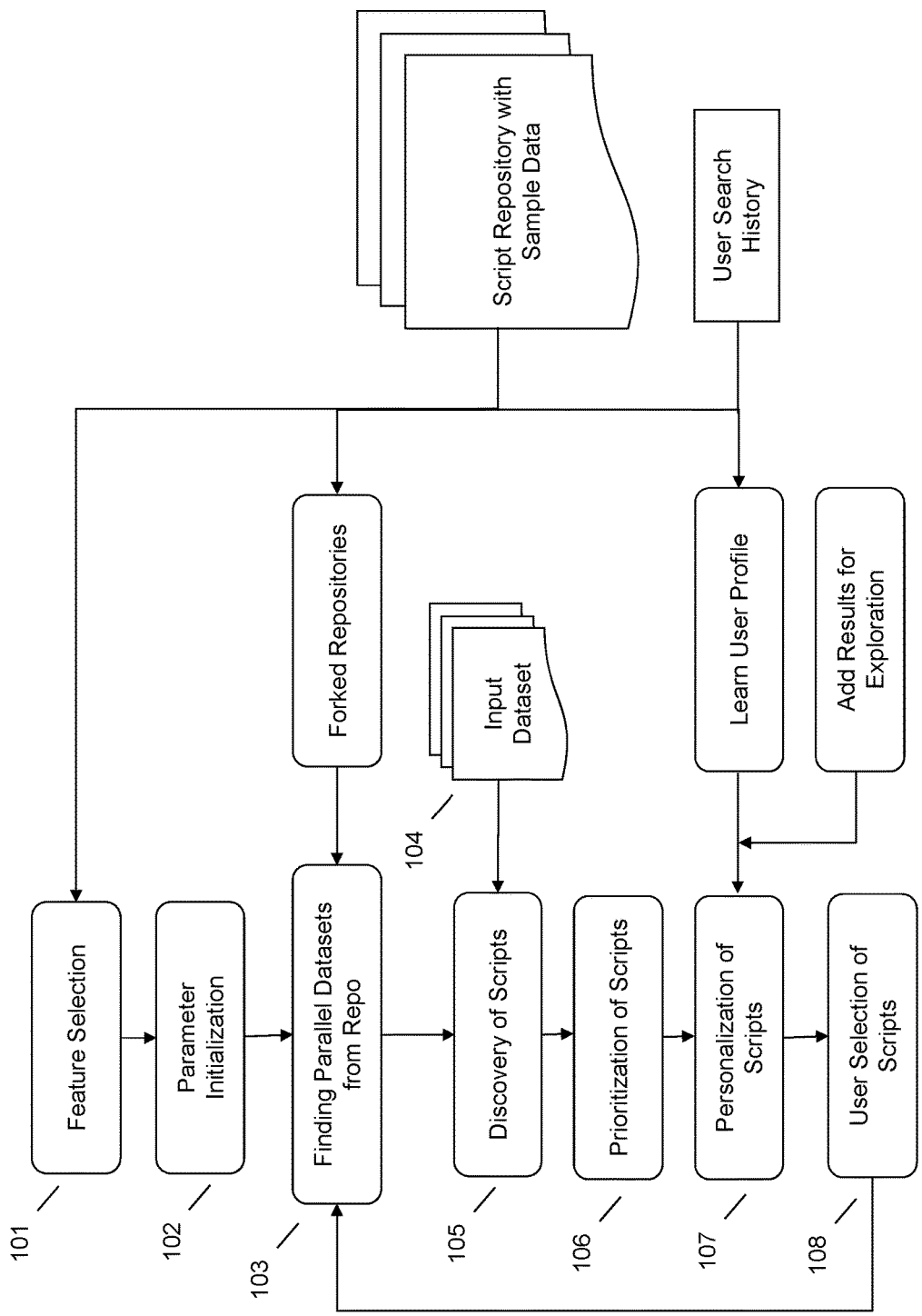
FIG. 1 illustrates an example method of automatic discovery of analysis scripts for a dataset.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, most if not all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

Analysis scripts are reusable on many datasets. However, in order to be reused (or repurposed), the analysis scripts of interest must be identified. Conventionally this may only be accomplished by searching the textual descriptions associated with the analysis scripts. Thus, if an analysis script has a description or code comments, a key word search may find the analysis script within the repository. However, as may be appreciated, not all analysis scripts have satisfactory textual descriptions and thus their identification proves illusory. Moreover, many users are not aware that a particular dataset could or should be analyzed in a given way, i.e., by a particular type of analysis script. Practically, the result is that many analysis scripts are re-written unnecessarily and many datasets are not analyzed with existing, high quality analysis scripts.

In view of the above technical issue regarding the inability to conveniently identify relevant analysis scripts within a repository, an embodiment implements a technique by which a dataset of interest, e.g., a dataset to be analyzed by an analysis script, is used to search for and identify relevant existing analysis scripts by comparison with datasets in the repository that are associated with the analysis scripts. This relieves the user of having to search using keywords and expands the ability of users to discover relevant analysis scripts that already exist within the script repository, even if some or all of the existing scripts lack useful textual descriptions.

In an embodiment, feature selection is performed to select one or more features from a dataset to use in a script discovery/searching process. Parameter initialization may be used to provide a naive representation for a dataset given the feature(s) selected. A model for discovering relevant datasets in a repository may be trained or refined, e.g., by selecting parallel datasets or datasets that are known to be related, e.g., identified from forked repositories, and/or via accepting user feedback, etc. Representation learning based on the retrieved datasets may then be employed. The model learns feature(s) to be used in discovering analysis scripts that are associated with like datasets in the repository.

The analysis scripts identified as relevant may be prioritized by an embodiment. For example, a prioritization or even a personalization of the results may be accomplished, such as through use of a user history and/or user feedback, so that a user is provided with custom or personalized results. The process may be improved in future rounds, e.g., by using user feedback to improve or fine tune the representation learning referred to herein.

Referring now to FIG. 1, an example work flow for automatic discovery of analysis scripts for a dataset is illustrated. Therein, a feature selection step is illustrated at 101. The feature selection at 101 includes a process by which the system selects one or more features of a dataset in order to identify like or matched datasets. In the example of FIG. 1, datasets of a script repository are first used to identify features that initialize a naive model. Thus, when a user inputs (or otherwise provides access to) a dataset for searching (illustrated at 104 of FIG. 1 and further described herein), the searching tool may extract feature(s) from that dataset for use in identifying like datasets in the script repository, and thus the associated analysis scripts.

Examples of features of a dataset include but are not necessarily limited to a file extension of the dataset, a file name of the dataset (or file name patterns, if multiple datasets are considered), a file header of the dataset (e.g., a description of the dataset included in a beginning part of the dataset file), a file structure of the dataset (e.g., JSON, CSV, XML, etc.), data type of the data set, and tag/phrases in the dataset file.

The feature(s) is/are known (for structured/semi-structured datasets) or discoverable (for semi-structured/unstructured datasets). The discovering of the feature(s) may be done hierarchically or at different levels. For example, a tag including server uptime may be discovered as a feature within a set of datasets, after the datasets in that set have been identified as having a given file extension and name pattern of interest. In addition, other feature selection techniques may be utilized such as analysis of a corpus associated with the datasets, e.g., using LSTM (long short term memory) deep learning techniques.

After feature(s) have been selected at 101, parameter initialization may be performed, as illustrated at 102. For example, an auto-encoder may be utilized to learn a representation of the feature(s) selected at 101. An auto-encoder is an artificial neural network that learns a compressed, distributed representation of the selected features. The representations are learned such that the representations are able to reconstruct the original selected features. The self reconstruction technique assists in deriving meaningful representations of a given dataset. Additionally, the representations may be used in retrieving similar datasets.

The parameters initialized may thereafter be further refined as the system operates on subsequent datasets, as illustrated in FIG. 1 at 103. Here, known, like datasets (e.g., such as datasets identified from forked repositories) may be used to train the initialized model. By way of example, repositories that are forked out of an existing repository have a high likelihood of having different datasets that are of the same type. Also, datasets belonging to the same script have a high likelihood of having different datasets of the same type. Such datasets may be used as parallel datasets at 103 for training the system.

Therefore, at 102 a basic representation that compactly represents the selected features of the dataset is available. However, the representation does not necessarily capture complex relationships between similar datasets. At 103 the parallel or similar datasets are used to fine-tune the model initialized at 102. For instance, an inference formed at 102 may be fine tuned at 103 such that two datasets that are similar have less Euclidean distance as compared to two datasets that are dissimilar for an appropriately chosen distance metric. As the output of 103 of FIG. 1, an embodiment obtains a representation learning that captures complex relationships between datasets that cannot be identified using a rule based system.

The features used to leverage an input data set to discover relevant analysis scripts may improve over time. By way of example, if a user manually labels similar and non-similar datasets, then neural models are available that can automatically extract common new features between datasets that are useful in discovering new datasets and thus relevant analysis scripts. However, manual input by the user may not be practical or desirable. Thus, an embodiment provides for an automated approach to learn new features over time.

By way of specific example, using a forked repository associated with an input or sample dataset, an embodiment may consider these datasets to be parallel datasets for discovery of new features that are useful in identifying like datasets and thus relevant analysis scripts. Likewise, datasets in the same script folders (e.g., on a user's client repository) may be utilized to identify parallel datasets for feature discovery.

Implicit user feedback may be useful in identifying parallel datasets and thus useful features. For example, if the system returns "x" analysis scripts and a user selects "y" scripts (a sub-set of "x"), then this means that datasets related to the "y" scripts are parallel datasets.

Such parallel datasets then may be used to retrieve more features to improve learning over time by identifying features shared between parallel datasets that may be used to identify datasets and thus relevant scripts from the script repository.

Given an input dataset by the user at 104, an embodiment obtains the dataset's representation, i.e., using extracted feature(s) of the input dataset. A similarity index (such as Euclidean distance) may be used to identify a set of top—k datasets and their associated analysis scripts from the repository in a discovery or searching step at 105. These top—k analysis scripts may in turn be provided to the user, optionally after a prioritization (illustrated at 106) has been conducted to prioritize, organize or otherwise sort the top—k analysis scripts in the result listing. For example, scripts may be prioritized at 106 by retrieving the top—k datasets (with associated analysis scripts) that have a higher similarity index with the representation of the input dataset (refer to 104 of FIG. 1). The analysis scripts associated with the top—k datasets are the relevant scripts that could be used on the input dataset.

A personalization or customization (illustrated at 107) of the result listing may also be provided by an embodiment, e.g., utilizing data of a user profile or other user specific information such as a user client script repository. The user profile information may also include a user search history. This user specific information may be used to prioritize, organize or otherwise sort the top—k analysis scripts in the result listing.

The personalization of the top—k analysis scripts, i.e., adjusting the ranking thereof, as illustrated at 107 of FIG. 1, may include sorting the top—k analysis scripts again based on the similarity index between the representations of the datasets associated with the top—k analysis scripts and one or more representations of datasets included in the user's profile. For example, a user may have stored in his or her profile user—specific representations of analysis scripts or datasets, e.g., created or saved by the user conducting the search. Thus, retrieved datasets associated with the top—k result listing of scripts that are more like dataset(s) in a user's personal dataset repository may come first in the listing. The personalization at 107 permits an embodiment to prioritize or promote analysis scripts in the top—k result listing that are of interest to the specific user.

As illustrated at 108 of FIG. 1, a fine tuning or refinement of the discovery or searching model may be accomplished according to an embodiment. The learned representation (illustrated at 103) may be fine tuned based on implicit and/or explicit user feedback, as illustrated by the connecting arrow linking element 108 and 103 in FIG. 1. For example, when the discovery or searching model retrieves the top—k similar analysis scripts at 105 for a given input dataset (104), an embodiment may also track the analysis script that the user is interested in among the top—k analysis scripts. An embodiment may then also retrieve related datasets of the repository associated with that analysis script of particular interest. This is akin to an inference that the retrieved datasets are similar to the input dataset (104).

As time progresses, the model evolves to learn more implicit relationships linking the datasets of the script repository and thus the analysis scripts. This may progress in an unsupervised manner based on the implicit or explicit user feedback regarding the result listing. As may be appreciated, the user feedback may be given different weighting in terms of fine tuning the discovery/searching model. For example, different weights may be assigned based on whether the feedback is a user selection in the result listing, the existence of a repository fork, an active repository fork, etc. Additional learning mechanisms may be employed. For example, extra analysis scripts (e.g., from users or sources already included in the results listing proper) may be included to gain user feedback (implicit or explicit) on the additional added scripts (e.g., additional scripts added up to an acceptable error threshold).

Therefore, an embodiment represents a technical improvement that provides a user with a capability to search for analysis scripts in a repository using an input (or identified) dataset. This permits the user to identify analysis scripts that may be used to analyze the data of the input dataset without resort to conventional key work search tools.

Figure 2:
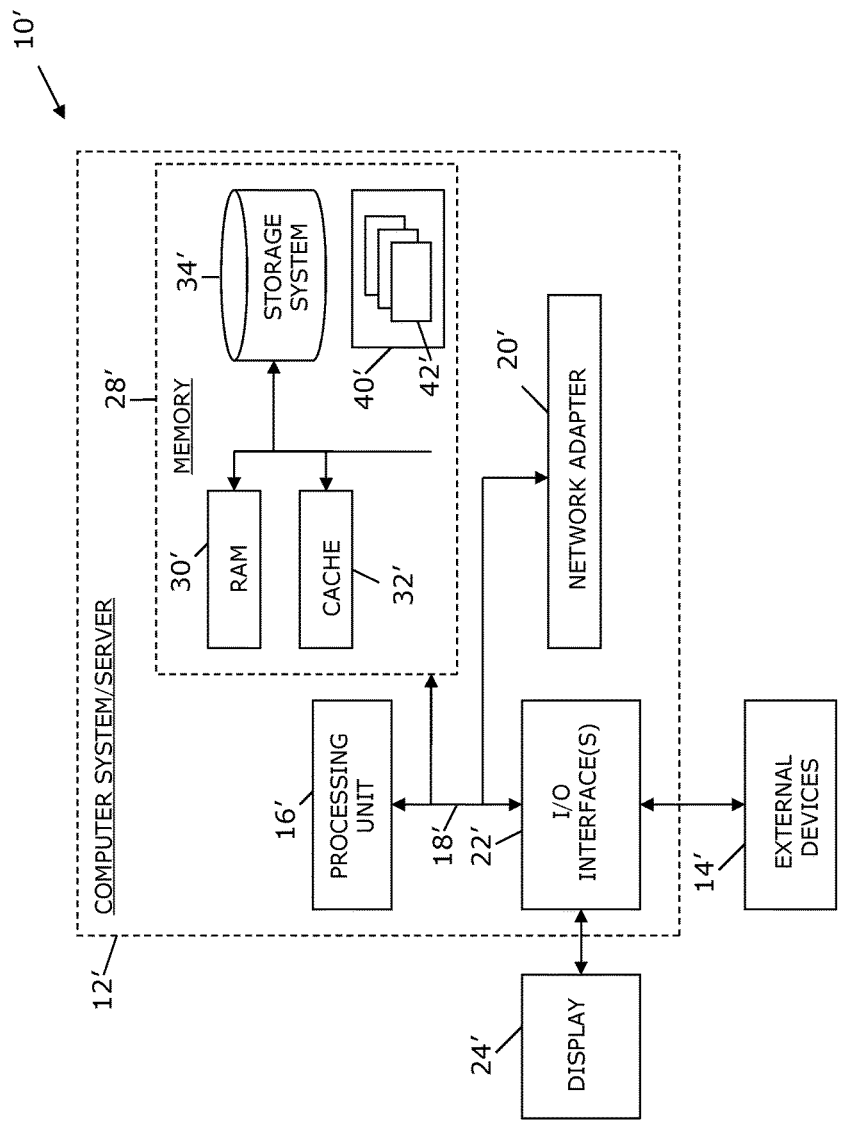
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of automatic discovery of analysis scripts for a dataset, the method comprising:
    utilizing at least one processor to execute computer code that performs the steps of:
    receiving, at a script searching tool, an input dataset;
    extracting at least one feature from the input dataset;
    searching, in a script repository, a plurality of datasets having analysis scripts associated therewith, wherein each analysis script comprises program code that analyzes a dataset in a predetermined manner per the program code of the analysis script;
    said searching comprising finding, using the at least one feature of the input dataset to search the plurality of datasets, one or more datasets of the plurality of datasets having the at least one feature;
    identifying, based on the one or more datasets of the plurality of datasets having the feature, one or more associated analysis scripts, wherein each of the one or more associated analysis scripts comprise at least one analysis script corresponding to at least one of the one or more datasets having the feature;
    returning, via a user interface, a result listing of the one or more associated analysis scripts; and
    analyzing the input dataset using an analysis script selected by a user from the one or more associated analysis scripts within the result listing.

2. The method of claim 1, comprising prioritizing results of the result listing.

3. The method of claim 2, wherein the prioritizing comprises promoting an analysis script included in the result listing based on a factor selected from the group consisting of a user input, a user profile and a sample dataset.

4. The method of claim 3, wherein the user profile comprises information selected from the group consisting of: a user search history and one or more datasets stored in a user client repository.

5. The method of claim 1, wherein the extracted feature comprises a feature selected from the group consisting of a dataset column name, a dataset file name, a dataset file header, a dataset file structure, and a dataset type.

6. The method of claim 1, wherein the feature of the input dataset comprises a relational feature.

7. The method of claim 6, wherein the relational feature is selected from the group consisting of a file name pattern, a parallel dataset, and a forked repository.

8. The method of claim 1, wherein the searching comprises employing a trained model to search based on the feature of the input dataset.

9. The method of claim 8, comprising:
    receiving user feedback in response to the result listing; and
    updating the trained model based on the user feedback.

10. An apparatus for automatic discovery of analysis scripts for a dataset, the apparatus comprising:
    at least one processor; and
    a computer readable storage medium having computer readable program code embodied therewith and executable by the at least one processor to:
    receive, at a script searching tool, an input dataset;

extract at least one feature from the input dataset;

search, in a script repository, a plurality of datasets having analysis scripts associated therewith, wherein each analysis script comprises program code that analyzes a dataset in a predetermined manner per the program code of the analysis script;

said searching comprising finding, using the at least one feature of the input dataset to search the plurality of datasets, one or more datasets of the plurality of datasets having the at least one feature;

identify, based on the one or more datasets of the plurality of datasets having the feature, one or more associated analysis scripts, wherein each of the one or more associated analysis scripts comprise at least one analysis script corresponding to at least one of the one or more datasets having the feature;

return, via a user interface, a result listing of the one or more associated analysis scripts; and analyzes the input dataset using an analysis script selected by a user from the one or more associated analysis scripts within the result listing.

11. A computer program product for automatic discovery of analysis scripts for a dataset, the computer program product comprising:

a computer readable storage medium having computer readable program code embodied therewith and executable by at least one processor to:

receive, at a script searching tool, an input dataset;

extract at least one feature from the input dataset;

search, in a script repository, a plurality of datasets having analysis scripts associated therewith, wherein each analysis script comprises program code that analyzes a dataset in a predetermined manner per the program code of the analysis script;

said searching comprising finding, using the at least one feature of the input dataset to search the plurality of datasets, one or more datasets of the plurality of datasets having the at least one feature;

identify, based on the one or more datasets of the plurality of datasets having the feature, one or more associated analysis scripts, wherein each of the one or more associated analysis scripts comprise at least one analysis script corresponding to at least one of the one or more datasets having the feature;

return, via a user interface, a result listing of the one or more associated analysis scripts; and analyzes the input dataset using an analysis script selected by a user from the one or more associated analysis scripts within the result listing.

12. The computer program product of claim 11, further comprising prioritizing results of the result listing.

13. The computer program product of claim 12, wherein the prioritizing comprises promoting an analysis script included in the result listing based on a factor selected from the group consisting of a user input, a user profile and a sample dataset.

14. The computer program product of claim 13, wherein the user profile comprises information selected from the group consisting of: a user search history and one or more datasets stored in a user client repository.

15. The computer program product of claim 11, wherein the extracted feature comprises a feature selected from the group consisting of a dataset column name, a dataset file name, a dataset file header, a dataset file structure, and a dataset type.

16. The computer program product of claim 11, wherein the searching comprises employing a trained model to search based on the feature of the input dataset.

17. The computer program product of claim 12, comprising:

receiving user feedback in response to the result listing; and updating the trained model based on the user feedback.

18. A method of automatic discovery of analysis scripts for a dataset, the method comprising:

utilizing at least one processor to execute computer code that performs the steps of:

receiving, at a script searching tool, an input dataset;

extracting at least one feature from the input dataset, said extracting comprising use of one or more features identified from a user specific dataset repository;

searching, in a script repository, a plurality of datasets having analysis scripts associated therewith, wherein each analysis script comprises program code that analyzes a dataset in a predetermined manner per the program code of the analysis script;

said searching comprising finding, using the extracted feature of the input dataset to search the plurality of datasets, one or more datasets of the plurality of datasets having the extracted feature;

identifying, based on the one or more datasets of the plurality of datasets having the extracted feature, one or more associated analysis scripts, wherein each of the one or more associated analysis scripts comprise at least one analysis script corresponding to at least one of the one or more datasets having the extracted feature;

prioritizing, using user specific information, the one or more associated analysis scripts;

returning, via a user interface, a result listing comprising the one or more associated analysis scripts;

said results list being organized according to the prioritizing;

wherein said results list is customized by consultation of the user specific information; and analyzing the input dataset using an analysis script selected by a user from the one or more associated analysis scripts within the results list.

* * * * *